United States Patent [19]

Schmidt et al.

[11] Patent Number: 5,297,905
[45] Date of Patent: Mar. 29, 1994

[54] TOOL FOR PROCESSING DRILLED HOLES

[75] Inventors: Hermann Schmidt, Reutlingen; Dieter Aulich, Gomaringen; Peter Essig, Reutlingen, all of Fed. Rep. of Germany

[73] Assignee: Robert Bosch GmbH, Stuttgart, Fed. Rep. of Germany

[21] Appl. No.: 867,110
[22] PCT Filed: Dec. 22, 1990
[86] PCT No.: PCT/DE90/00986
§ 371 Date: Jan. 29, 1992
§ 102(e) Date: Jan. 29, 1992

[30] Foreign Application Priority Data

Jan. 9, 1990 [DE] Fed. Rep. of Germany ....... 4000403

[51] Int. Cl.$^5$ .............................. B23B 51/00
[52] U.S. Cl. ...................... 408/145; 407/8; 408/199
[58] Field of Search ............ 408/27, 145, 156, 153, 408/144, 154, 227, 199; 407/8, 9; 51/394, 403, 407, 281 P, 328

[56] References Cited

U.S. PATENT DOCUMENTS

| | | | |
|---|---|---|---|
| 2,732,612 | 1/1956 | Hallock | 408/227 |
| 5,158,405 | 10/1992 | Serafin | 408/145 |

FOREIGN PATENT DOCUMENTS

| | | | |
|---|---|---|---|
| 10527 | 7/1991 | PCT Int'l Appl. | 408/144 |
| 638453 | 12/1978 | U.S.S.R. | 407/8 |
| 952468 | 8/1982 | U.S.S.R. | 408/145 |

*Primary Examiner*—Daniel W. Howell
*Attorney, Agent, or Firm*—Michael J. Striker

[57] ABSTRACT

A tool for processing holes has a shaft which can be clamped in a drive element for executing a forward stroke into a working position within a hole, a return stroke, and an at least rotating working motion of the tool, two support elements arranged on the shaft, wires clamped at one end of the shaft between the support elements and being sprung bowing away from the shaft in an arc shape, the wires being coated with a cutting medium. One of the support elements is axially adjustable relative to the shaft. The shaft has axially positioned slots distributed on a circumference in two regions axially offset from one another. The shaft also has an axial hole leading out from both ends of the shaft and extending into the regions. The support elements are formed as limit stops inserted in the axial hole and each end just short of an entry of the hole into an area of the slots. The wires have ends extending through the slots and coming to rest on the limit stops.

15 Claims, 1 Drawing Sheet

TOOL FOR PROCESSING DRILLED HOLES

BACKGROUND OF THE INVENTION

The present invention relates to a tool for processing drilled holes.

More particularly, it relates to a tool which has a shaft which can be clamped into a drive element which serves to execute a forward stroke of the tool into a working position within the hole, a return stroke, and an at least rotating working motion of the tool, wires clamped at one end of the shaft between two support elements on the shaft and being sprung bowing away from the shaft in an arc shape and coated with a cutting medium, with one of the support elements is axially adjustable relative to the shaft.

In a tool of this type, two sleeves are fitted on a solid shaft; these sleeves surround the shaft, at a distance from one another, and into them are inserted, between shaft and sleeve, on the side facing each other, a large number of wires which are supported with their ends on the sleeves, are tensioned in an arc shape, and are coated with a cutting agent. The wires lie very close together, so that they fill out the whole circumference around the shaft and cannot be displaced towards one another in the circumferential direction at the support point. One of the sleeves can be axially adjusted relative to the shaft by means of a screw thread, so that the wires can be prestressed to a greater or lesser extent, producing more or less bowing-out from the shaft. The tool is inserted into the holes to be treated, and can then be used, for example, to remove particles of material protruding from a transverse hole into the drilled hole, by a rotating motion. Due to the necessary close coverage with wires over the circumference, the tool is relatively rigid, but can process drilled holes of different diameters only within a narrow tolerance range. In order to prevent the wires from being twisted or pulled out, the direction of drive must be continuously reversed during the processing. Moreover, as the tool is relatively large it is not possible to go below a lower diameter range of the hole to be treated. For technical and production reasons, this diameter is 8 mm in the known tool. One disadvantage is that replacing the wires in the case of damage, or when the cutting agent coating has been worn off, necessitates the replacement of all the wires, even if some of them could still be usable.

Such tools, and other tools, are used for ultra-fine and most closely toleranced after-treatment of holes, in particular, in those cases where there are also transverse holes breaking into the drilled holes. In items of this nature, after the completion of a longitudinal hole into which, for example, a pump plunger of a fuel injection pump will later have to operate under very high pressures of e.g. 1,000 bar, and after completion of the transverse holes leading into this longitudinal hole, the longitudinal hole is microfinished by honing after the workpiece has been hardened. Following such processes burrs regularly occur, which protrude into the transverse hole and would lead to faults in the operation of the fuel injection pump. These burrs must be removed. This can be achieved with a burring tool, such as is known from DE-OS 3333499. This is effected by inserting a deburring tool from the outside through the transverse hole which removes the burrs at the junction between the transverse hole and the longitudinal hole. A further problem exists in that the breakthrough of the transverse hole into the longitudinal hole is not in a flat plane, so that the deburring tool removes varying amounts of material from different areas of the circumference; thus the desired sharp-edged transition from transverse hole to longitudinal hole is not ensured. This deburring also has the result that, in turn, a residue of burrs protrudes into the longitudinal hole. This would result in causing the high-precision pump plunger to seize in the longitudinal hole. For this reason, the remaining burrs must subsequently be removed, once again, without detriment the surface of the finished honed longitudinal hole. This removal of the residual burr, or of burrs which protrude into a hole in general, can be effected by means of a tool in accordance with the state of technology mentioned above, or else round brushes are used whose external circumference is accurately matched to the diameter of the longitudinal hole and which has nylon bristles with a cutting agent added. These round brushes have a diameter which is accurately matched to the diameter of the longitudinal hole, and when they are used for the first time they must be clamped over a defined length and aligned to prevent running out of true. A further disadvantage is that the brushes have only a relatively short life, since due to wear, the diameter reduction is possible only in a very narrow range. Brush material being welded on to the wall of the longitudinal hole can also occur. Subsequent cleaning of the longitudinal hole in turn means increased expense. If the round brushes are used with cutting oil, then such deposits are avoided, but the efficiency of the bristles is diminished due to lower rigidity with reducing contact pressure. Furthermore, for each drilled hole diameter, an matched brush must be used, so that in the machines providing the processing, different workpiece diameters present a problem.

SUMMARY OF THE INVENTION

Accordingly, it is an object of the present invention to provide a tool of the above mentioned general type, which avoids the disadvantages of the prior art.

In keeping with these objects and with others which will become apparent hereinafter, one feature of the present invention resides, briefly stated, in a tool, in which the shaft has axially positioned slots distributed on the circumference in two regions axially offset from one another, as well as an axial hole leading out of both ends of the shaft, preferably two blind holes, which both extend into the regions and to which limit stops are inserted as support elements, with each stop ending in the hole just short of its entry into the area of the slots, and on which the ends of the wire fed through the slots come to rest.

When the tool is designed in accordance with the present invention, it offers the advantage that holes of different diameters can be simply and precisely processed, with practically consistent results being achieved, even when dealing with relatively large diameter variations. Moreover, the tool can also be used successfully for hole diameters smaller than 8 mm. Once a tool has been chucked, workpieces of different diameter holes can be processed. The tool has a long tool and the wires coated with the cutting medium can be quickly and simply replaced. The number of coated wires required to equip a tool is relatively small. As a result, stock-keeping for the wear parts of the tool is simple and economical, and repair times are short. The wires are held securely in the slots, and with their preloading or bowing, they can be simply and accurately adjusted to match different hole diameters. Since the coating of the wires consists of the same or similar material as that of the strips of honing tools, the high processing quality achieved in the longitudinal hole before the final deburring is maintained. Due to the targeted precise contacting of the wires on the surface of the hole, the processing time is short in comparison with processing with brushes. The tool can be used both with cutting oil or dry. Due to the flexibility of the wires, conical, longitudinally elliptical, or offset holes can be processed.

In accordance with an advantageous embodiment of the present invention, a compression spring is held between one limit stop formed as a pin and a bolt which adjusts the pin, and the bolt is adjustable in direction of the spring until it comes to rest on a shoulder. This embodiment provides, in an advantageous manner, for an almost constant contact pressure of the wires on the wall of the hole to be achieved, since the limit stop can be moved against the compression spring, and the compression spring essentially determines the radial force component on the wall of the hole. Further, this contact pressure can be individually varied when selecting the compression spring, via the spring constant.

In accordance with still a further embodiment of the present invention, the bolt is designed as a stud, and the compression spring is supported on the pin and/or stud via a hardened ball. In this embodiment the condition is achieved whereby, with any adjustment of the pin on which the wires are supported, a rotational motion is transmitted to the pin via the stud, and thus the ends of the wires are not restrained within the slots, but remain freely movable. The embodiment in accordance with claim 6 ensures that the slots are not closed by the pin moving into the region of the slots, and that the ends of the wires can thus be easily inserted.

In accordance with another embodiment of the present invention, the coating of the wires with cutting medium is provided in the middle region, but no further than just short of the entry of the wires into the slots. This embodiment achieves the condition that the slots are subjected to the minimum wear by the movement of the wires on insertion and removal of the tool, so that long and satisfactory operation of the wires is guaranteed. This can also ensure that the entering edge of the hole to be treated is not subjected to excessive stock removal during the insertion procedure. Until the final form of the wires, matched to the hole, has been achieved, these wires slide past the opening of the hole with their uncoated portions. Only in the final state do the coated parts of the wires rest on the wall of the hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
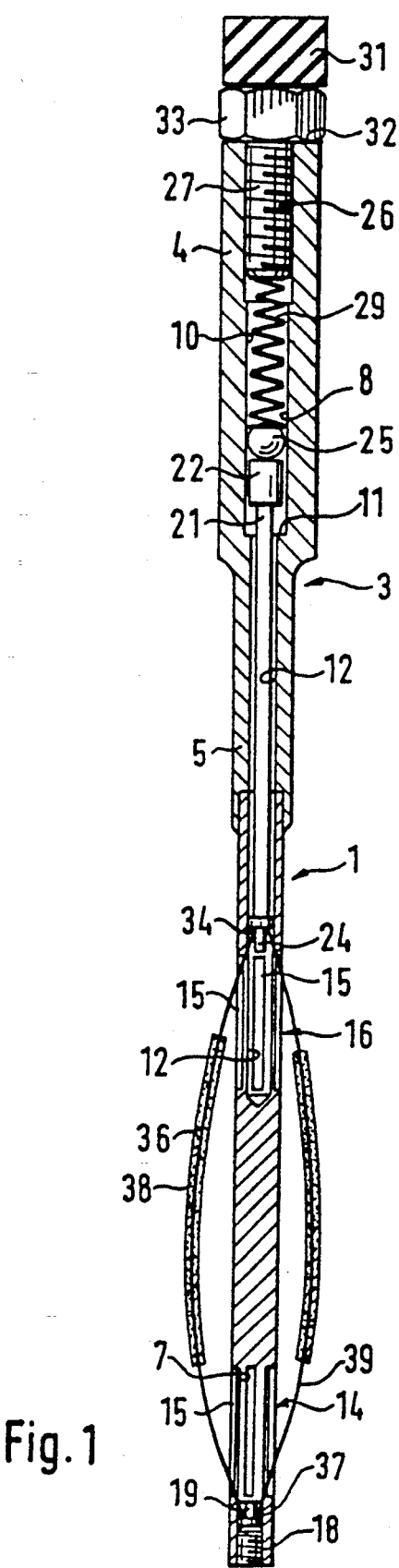
FIG. 1 shows a cross-sectional view of the tool in accordance with this invention.

The tool for processing holes, shown in longitudinal section in FIG. 1, has a shaft 1, which in this example is designed as a subdivided shaft with a front shaft part 2 on the workpiece side. This shaft part has a constant external diameter, and is set into a second shaft part 3 on the front end. The shaft part 3 has a locating shaft 4, via which it can be inserted in a chuck, not shown here, of a drive element. The locating shaft 4 leads into a intermediate piece 5 with a smaller diameter, into which, as mentioned above, the shaft part 2 is inserted on the front end.

The shaft has a first blind hole 7, which is formed coaxially to the axis of shaft part 2 on the front end of the shaft part's workpiece side. Further, the shaft has a second coaxial blind hole 8 which is designed as a stepped hole with a stepped hole portion 10 of a larger diameter, located in the region of the locating shaft. This stepped hole portion, forming a shoulder 11, leads into a stepped hole portion 12 of a smaller diameter, with this stepped hole portion extending in the region of the intermediate piece 5 and there subsequently into shaft part 2.

On the shaft part 2 a first area 14, is provided in which slots 15 are evenly arranged, parallel to the axis, on the circumference of the shaft part 2; these converge into the first blind hole 7 over their entire length. Furthermore, on the shaft part 2, at an axial distance from the first area 14, a second area 16 is provided in which slots 15, also distributed around the circumference, are provided. They are axially limited and over their entire length converge into the stepped hole portion 12 with the smaller diameter, within the shaft part 2. Advantageously, the number of slots is an even multiple, so that two slots always lie diametrically opposite one another, which simplifies manufacture. The first blind hole 7 is closed on the front end by a stopper or a screwed part 18, which extends to just before the start of the slots and is there equipped, on its front end, with a tappet 19. In the embodiment example in question, the stopper 18 is firmly connected with the shaft part 2.

Inserted into the second blind hole 8 is a pin 21, which has a head 22 towards the locating shaft. The head slides inside the larger diameter stepped hole portion 10, and can be brought to rest against the shoulder 11. In this position, the end of the pin 21 is located just short of the start of the slots 15 on the locating shaft, so that these cannot be closed by the pin 21. On the front end, the pin 21 also has a tappet 24. On the head 22 of the pin is a hardened ball 25; held between this and a threaded bolt 27, which is screwed into an internal screw thread 26 of the stepped hole portion 10, is a compression spring 29. On the end protruding from the stepped hole portion 10 on the front end, the threaded bolt has a knurled head 31, with which the threaded bolt can be screwed in and out, and which does not exceed the external diameter of the locating shaft. Between the knurled head 31 and the front end 32 of the locating shaft, a lock nut 33 is screwed onto the stud, to fix its position or depth. Other options of securing are possible. The ball 25 prevents rotation being transmitted to the pin 21 when adjusting the threaded bolt 27, which otherwise could lead to the wires jamming in the slots. Between the tappet 24 on the pin 21 and its external circumference, a ring shoulder 34 is formed as a support surface. The ring shoulder should preferably consist of low-wear, hardened material, and the ends of sprung wires 36, fed through the slots 15, should come to rest against it. With its ring shoulder 34, the pin 21 serves as a support element at one end of these wires. At the other end, the wires 36 are fed through slots 15 of the first area 14, and come to rest on a ring shoulder 37, preferably also of hardened material, between tappet 19 and stopper 19. Together with the tappet 18, this ring shoulder forms a second support element. Since the distance between ring shoulder 34 and ring shoulder 37 is less than the length of the wires, these are bowed away from the shaft 2, and in the starting shape they have a bowed form. The wires are brought at least in the region of their insertion through the slots. The width of the slots is adapted to the diameter of the wires, so that these can be led in precise axial alignment. The provision of the tappet 24 or 19, prevents the ends of the wires from crossing over each other; in fact, they have a defined resting point in the immediate vicinity at the tappet. Clear of the slots, the wires are coated with a cutting medium, which for preference is of diamond grit, in a manner similar to that for cutting medium for honing strips. Other cutting media in use with honing strips are equally suitable for wire coating. The coating 38 on the wires preferably extends only in a middle region symmetrically to the centre portion of the bow formed by the wires in the starting condition. This results in an uncoated insertion region 39, which is located towards the end of the shaft part 2. In order to provide this insertion region, it would also be sufficient if the wires were coated, not symmetrically, but coated only on one side. However, it is simpler and safer for installation if a particular fitting position does not have to be observed when installing the wires.

The bowing of the wires 36 can be varied by the position of the support elements being changed relative to each other, by the stud 27 being screwed in or out.

Figure 2:
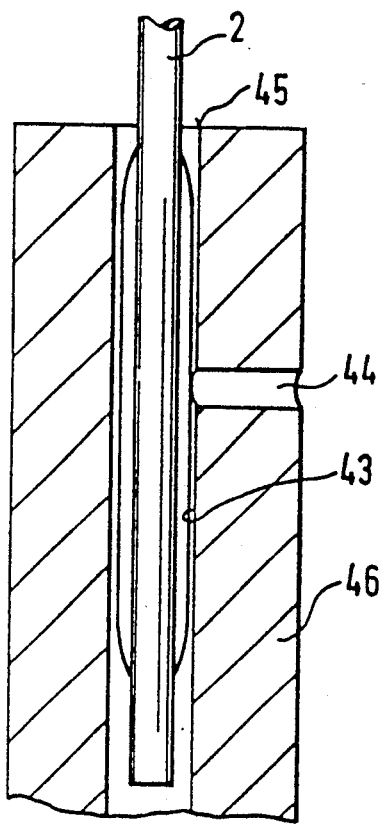
FIG. 2 shows the tool in use, within the hole to be processed.

Accordingly, the wires bow out to a greater or lesser extent. Thus the tool can be adapted to different hole diameters to be processed. In FIG. 2, the tool is shown inserted. The shaft part 2 was fed into a longitudinal hole 43, which had previously been microfinished by, for e.g. honing, by the feed of the drive element. A transverse hole 44, breaks into this longitudinal hole 43, of which the entering edge into the longitudinal hole 43 had previously been processed by, for e.g. a deburring tool, or which in general, on its entering edge has burrs protruding into the longitudinal hole 43. When the tool is inserted with the shaft part 3, the wires slide past the entering edge 45 of the longitudinal hole with their insertion regions 39 into the hole, and in doing so they are distorted in such a way that they then take on the shape shown in FIG. 2. Here, the wires rest with their coated part on the wall of the drilled hole, parallel to the axis, along generating lines of the longitudinal hole 43. Due to the fact that the wires can move together with the pin 21 against the force of the spring 29 in a longitudinal direction, it is ensured that there is an even contact pressure of the wires against the wall of the longitudinal hole 43. During the working motion of the tool which follows the forward stroke, and which may occur as a rotary movement, or a movement in only one direction, and which can also be effected to harmonise with the working motion of honing tools, the burrs at the transition from the transverse hole 44 to the longitudinal hole 43, is removed by the coating of the wires, without the surface quality of the longitudinal hole being adversely affected. In order to achieve a contact pressure of the wires within the longitudinal hole, it is necessary that the external diameter of the wires 36, in the state shown in FIG. 1, is greater than the diameter of the longitudinal hole 43. For preference, the difference should be a factor of 1.8. Thus an optimum length of the wires is brought to rest in the longitudinal hole. After processing the longitudinal hole 43 of the workpiece 46, the tool is withdrawn.

The tool can be used with a multiple-spindle honing machine in which the workpieces are automatically fed. It is also possible to process workpieces with longitudinal holes of differing diameters. By adjusting the free clamping length between the shoulders 34 and 37, in addition to the general diameter tolerances for the holes, holes of larger diameters can also be processed, e.g. within the range of 6 to 9 mm.

As an alternative to the described embodiment, the free clamping length of the wires can also be varied from the front end of the shaft part 2, if a setting pin is provided from this end. The setting of the embodiment shown in FIG. 1 could also be effected with an adjusting part of a different design, instead of by means of a stud. It is then advantageous to match the adjustment to that provided for honing tools.

With the tool as described, a multitude of processing options is offered, with it being possible to process not only cylindrical drilled holes but also drilled holes of other forms, since the wires adapt themselves according to the surface. At the end of their useful life, the wires can be easily removed from the tool. The head 22 resting on the shoulder 11 prevents the slots 15 being covered by the pin 21, making the insertion of new wires more difficult. Advantageously, it is possible to replace individual wires which show severe wear, this being easily effected due to the given distribution around the circumference.

It will be understood that each of the elements described above, or two or more together, may also find a useful application in other types of constructions differing from the types described above.

While the invention has been illustrated and described as embodied in a tool for processing drilled holes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool for processing holes, comprising a shaft which can be clamped in a drive element for executing a forward stroke into a working position within a hole, a return stroke, and an at least rotating working motion of the tool; two support elements arranged on the shaft; wires clamped at one end of the shaft between said support elements and being sprung bowing away from said shaft in an arc shape, said wires being coated with a cutting medium, one of said support elements being axially adjustable relative to said shaft, said shaft having axially positioned slots distributed on a circumference in two regions axially offset from one another, said shaft also having an axial hole leading out from both ends of said shaft and extending into said regions, said support elements being formed as limit stops inserted in said axial hole and each ending just short of an entry of said hole into an area of said slots, said wires having ends extending through said slots and coming to rest on said limit stops.

2. A tool for processing holes as defined in claim 1, wherein said axial hole is formed by two blind holes.

3. A tool for processing holes as defined in claim 1, wherein one of said limit stops is formed as a pin which is adjustable from outside.

4. A tool for processing holes as defined in claim 3; and further comprising a bolt which can be introduced from said one end of said shaft and adjust said pin.

5. A tool for processing holes as defined in claim 4; and further comprising a compression spring located between said bolt and said pin, said bolt being adjustable in the direction of said spring.

6. A tool for processing holes as defined in claim 5; and further comprising a shoulder against which said bolt comes to rest after being adjusted in the direction of said spring.

7. A tool for processing holes as defined in claim 4, wherein said bolt is formed as a stud.

8. A tool for processing holes as defined in claim 7, wherein said compression spring is supported on at least one of said pin and said stud via a hardened ball.

9. A tool for processing holes as defined in claim 8, wherein said compression spring is supported on said pin and on said stud via a hardened ball.

10. A tool for processing holes as defined in claim 6, wherein said axial hole has a larger diameter blind hole and a smaller diameter blind hole, said pin having a head at an end of said spring, said head sliding in said larger diameter blind hole, said pin having an adjustment path which is limited in direction towards said wires by said head resting against said shoulder, said shoulder being formed at a transition between said larger diameter blind hole and said smaller diameter blind hole.

11. A tool for processing holes as defined in claim 4, wherein said ball is formed as a stud provided with an knurled head located outside and having a locking element to secure the position of said stud.

12. A tool for processing holes as defined in claim 11, wherein said locking element is a locknut.

13. A tool for processing holes as defined in claim 1, wherein said limit stops have a tappet on a side facing said wires; and further comprising a further shoulder formed between said tappet and said limit stop so that said end of said wires comes to rest on said shoulder.

14. A tool for processing holes as defined in claim 1, wherein said cutting medium is provided in a middle region of said wires but no further than just short of an entry of said wires into said slots.

15. A tool for processing holes as defined in claim 1, wherein said cutting medium is a diamond grid embedded in a carrier agent.

* * * * *